(12) United States Patent
Lewis

(10) Patent No.: US 7,883,057 B2
(45) Date of Patent: Feb. 8, 2011

(54) PIVOTING DEVICE AND METHOD FOR CEILING PANELS

(75) Inventor: Michael S Lewis, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 324 days.

(21) Appl. No.: 11/763,765

(22) Filed: Jun. 15, 2007

(65) Prior Publication Data

US 2008/0307746 A1 Dec. 18, 2008

(51) Int. Cl.
*B64C 1/14* (2006.01)
(52) U.S. Cl. .................................. 244/129.1; 403/95
(58) Field of Classification Search ............ 248/292.14, 248/225.11, 222.52; 24/364; 403/79, 80, 403/95; 292/65, 302, 161, 162; 244/119, 244/129.1, 117 R, 118.5, 131
See application file for complete search history.

(56) References Cited

U.S. PATENT DOCUMENTS

| 246,364 | A | | 8/1881 | Birkmann | |
|---|---|---|---|---|---|
| 1,565,118 | A | * | 12/1925 | Stugard | 248/292.14 |
| 2,497,337 | A | * | 2/1950 | Ackerman | 16/259 |
| 4,167,772 | A | * | 9/1979 | Baehne | 361/758 |
| 4,490,883 | A | * | 1/1985 | Gauron | 16/245 |
| 5,201,831 | A | * | 4/1993 | Higgins et al. | 244/119 |
| 5,842,668 | A | * | 12/1998 | Spencer | 244/118.1 |
| 6,232,928 | B1 | * | 5/2001 | Zimmerman et al. | 343/882 |
| 6,357,609 | B1 | * | 3/2002 | Van Noord et al. | 211/90.02 |
| 6,733,061 | B1 | * | 5/2004 | Dykema et al. | 296/37.7 |

\* cited by examiner

*Primary Examiner*—Timothy D Collins
*Assistant Examiner*—Brian M O'Hara
(74) *Attorney, Agent, or Firm*—Klintworth & Rozenblat IP LLC

(57) ABSTRACT

In one embodiment, a device for hanging a ceiling panel may include a clevis for attachment to a support structure, and a hinge for attachment to the ceiling panel. The clevis may include a pin and a first locking member. The hinge may include an elongated slot and a second locking member. The elongated slot may be adapted to be slid over the pin of the clevis. The second locking member may be adapted to engage the first locking member to lock the hinge and the ceiling panel into position.

27 Claims, 7 Drawing Sheets

PIVOTING DEVICE AND METHOD FOR CEILING PANELS

BACKGROUND

Many devices exist for hanging ceiling panels in an aircraft, vehicle, or other structure. Some of these devices utilize complex, multiple bar linkage assemblies. However, this may lead to an increased cost of manufacturing, may make installation more difficult, may reduce load capacity, may be less durable, may have an abundance of moving parts, and/or may have other problems. Other devices and/or methods may experience different types of problems.

A device, and method of use, is needed to decrease one or more problems associated with one or more of the existing devices and/or methods for hanging ceiling panels.

SUMMARY

In one aspect of the disclosure, a device is provided for hanging a ceiling panel. The device comprises a clevis for attachment to a support structure, and a hinge for attachment to a ceiling panel. The clevis comprises a pin and a first locking member. The hinge comprises an elongated slot and a second locking member. The elongated slot is adapted to be slid over the pin of the clevis. The second locking member is adapted to engage the first locking member to lock the hinge and a ceiling panel into a position.

In another aspect of the disclosure, a method of hanging a ceiling panel is disclosed. In one step, a clevis is attached to a support structure. In another step, a hinge is attached to a ceiling panel. In still another step, an elongated slot of the hinge is slid over a pin of the clevis. In yet another step, a first locking member of the clevis is locked to a second locking member of the hinge in order to lock the hinge and the attached ceiling panel into a position.

In a further aspect of the disclosure, a device is provided for holding a ceiling panel. The device comprises a clevis attached to a support structure, and a hinge attached to the ceiling panel. The clevis comprises a pin and a first locking member. An elongated slot of the hinge was slid over the pin of the clevis. A second locking member of the hinge was locked to the first locking member of the clevis, so that the hinge and the attached ceiling panel are locked into a position.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
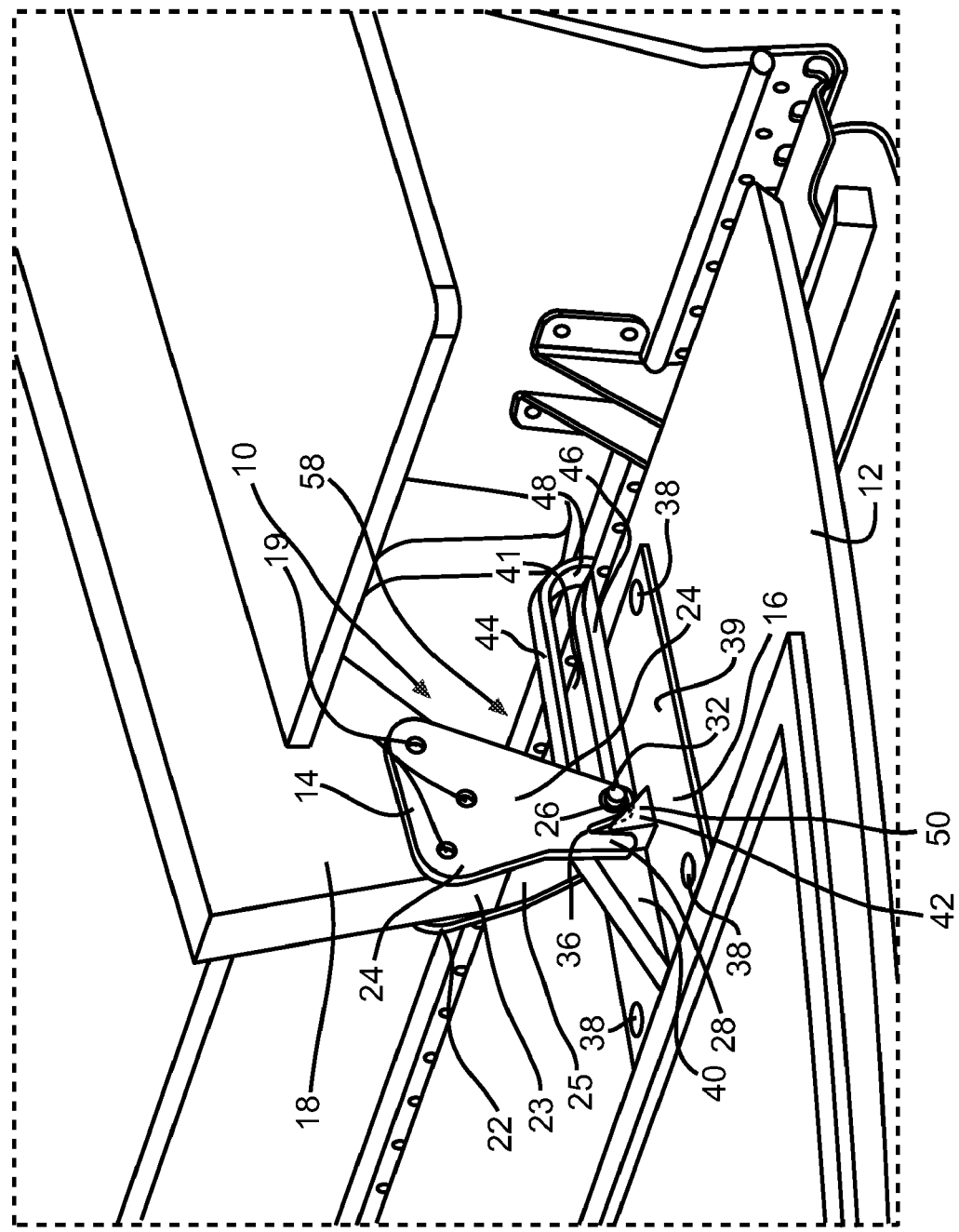
FIG. 1 shows a top-side perspective view of one embodiment of a device for hanging a ceiling panel.
Figure 2:
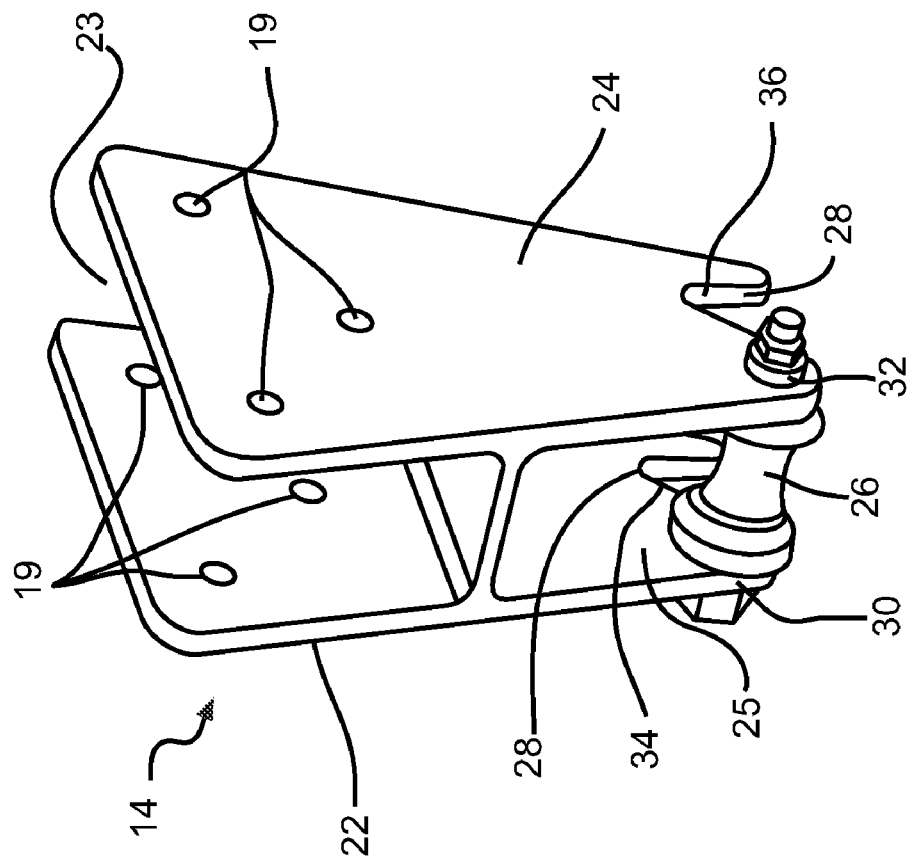
FIG. 2 shows a top-side perspective view of a clevis of the device of FIG. 1.
Figure 3:
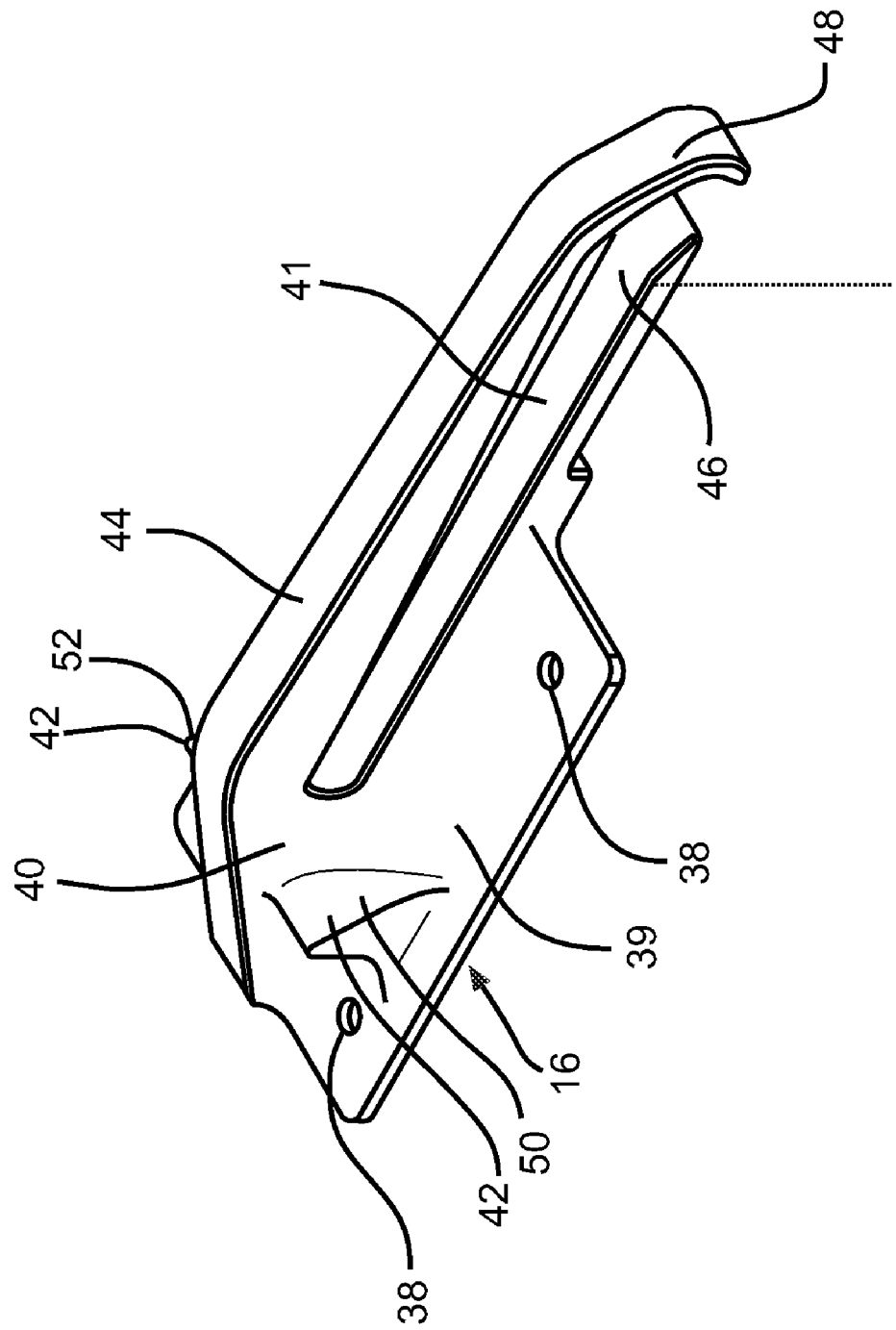
FIG. 3 shows a bottom-side perspective view of a hinge of the device of FIG. 1.

FIG. 1 shows a top-side perspective view of one embodiment of a device 10 for hanging a ceiling panel 12. The ceiling panel 12 may be hung in an aircraft, or in another vehicle, or structure. The device 10 may comprise a clevis 14 and a hinge 16. FIG. 2 shows a top-side perspective view of the clevis 14, while FIG. 3 shows a bottom-side perspective view of the hinge 16. The clevis 14 may be attached to a support structure 18, such as a frame of an aircraft, by bolting using openings 19 in the clevis 14, or using other attachment mechanisms. In other embodiments, the support structure 18 may comprise various portions of an aircraft, vehicle, or structure. The clevis 14 may comprise two side-walls 22 and 24 defining a structure receiving chamber 23, a hinge receiving chamber 25, a pin 26, and a first locking member 28. The pin 26 may extend from one hole 30 in side-wall 22 to another hole 32 in side-wall 24. The first locking member 28 may comprise notch 34 cut into side-wall 22 and notch 36 cut into side-wall 24. In other embodiments, the first locking member 28 may comprise without limitation a boss member, a female member, a male member, and/or another type of member. In still other embodiments, the clevis 14 may be of different types, sizes, orientations, and configurations.

The hinge 16 may be attached to a ceiling panel 12 through bolting or other attachment mechanisms. The hinge 16 may only comprise one integral piece, and may not be attached to any additional linkage members. The hinge 16 may have at least one opening 38 for bolting the hinge 16 to the ceiling panel 12. The hinge 16 may comprise a substantially planar surface 39, a surface 40 extending substantially perpendicular to the substantially planar surface 39, an elongated slot 41, and a second locking member 42. The elongated slot 41 may comprise two, elongated, parallel surfaces 44 and 46. An end 48 of the elongated slot 41 may be angled in the form of a hook. The elongated slot 41 may have been slid over the pin 26 of the clevis 14. The second locking member 42 may comprise boss members 50 and 52 extending out of opposite sides of the surface 40. In other embodiments, the second locking member 42 may comprise without limitations a notch, a female member, a male member, and/or another type of member. The second locking member 42 may be engaged to the first locking member 28 thereby locking the hinge 16 and the ceiling panel 12 into the position 58 shown in FIG. 1. In this position, the hinge 16 may be substantially perpendicular to the clevis 14. In other embodiments, the hinge 16 may be of different types, sizes, orientations, and configurations. It should be noted that the clevis 14 and the hinge 16 may each only comprise one integral piece. This may allow for the attachment of the ceiling panel 12 without using additional linkage members attached to either the clevis 14 or the hinge 16.

Figure 4:
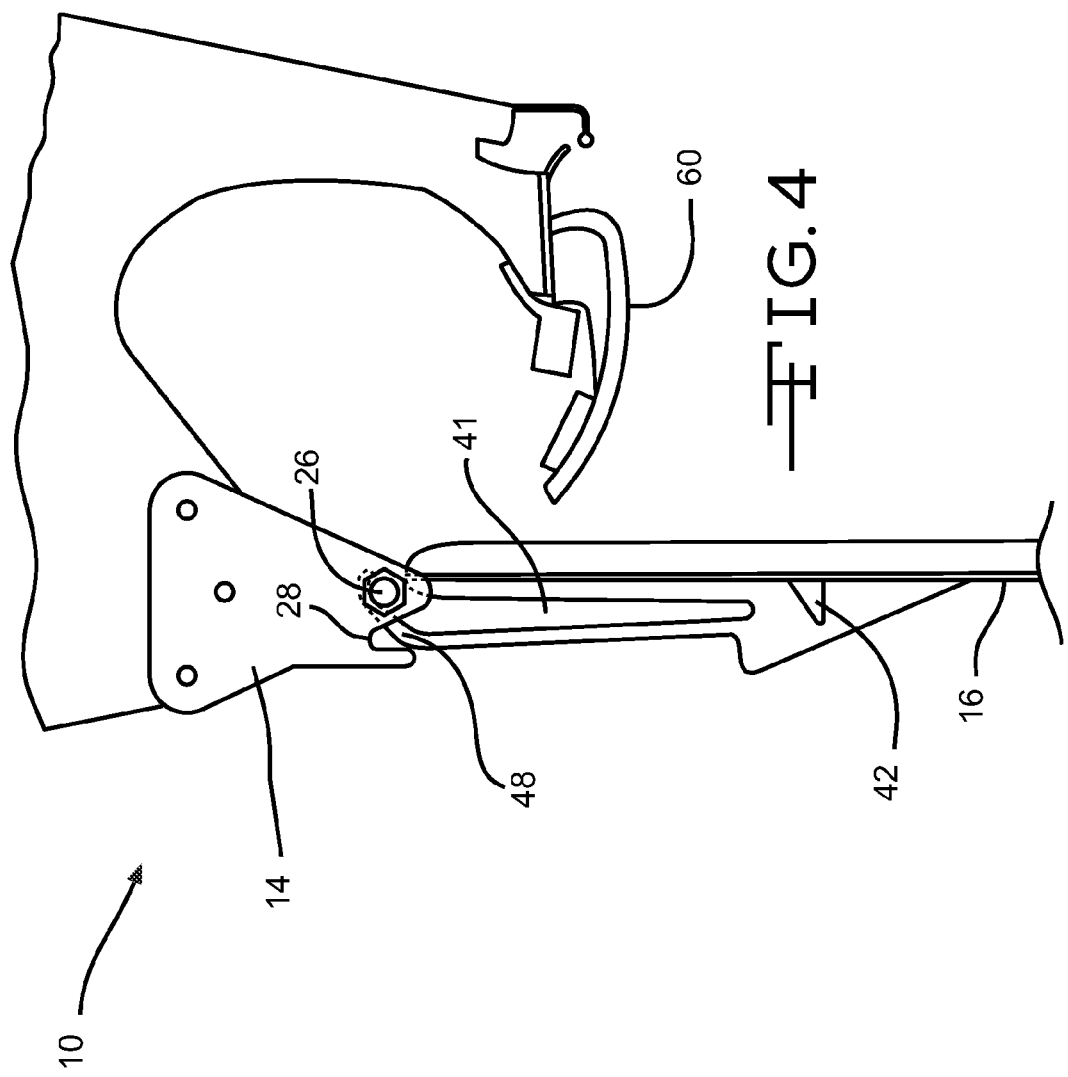
FIG. 4 shows a side view of the device of FIG. 1 prior to the hinge being attached to the clevis.
Figure 5:
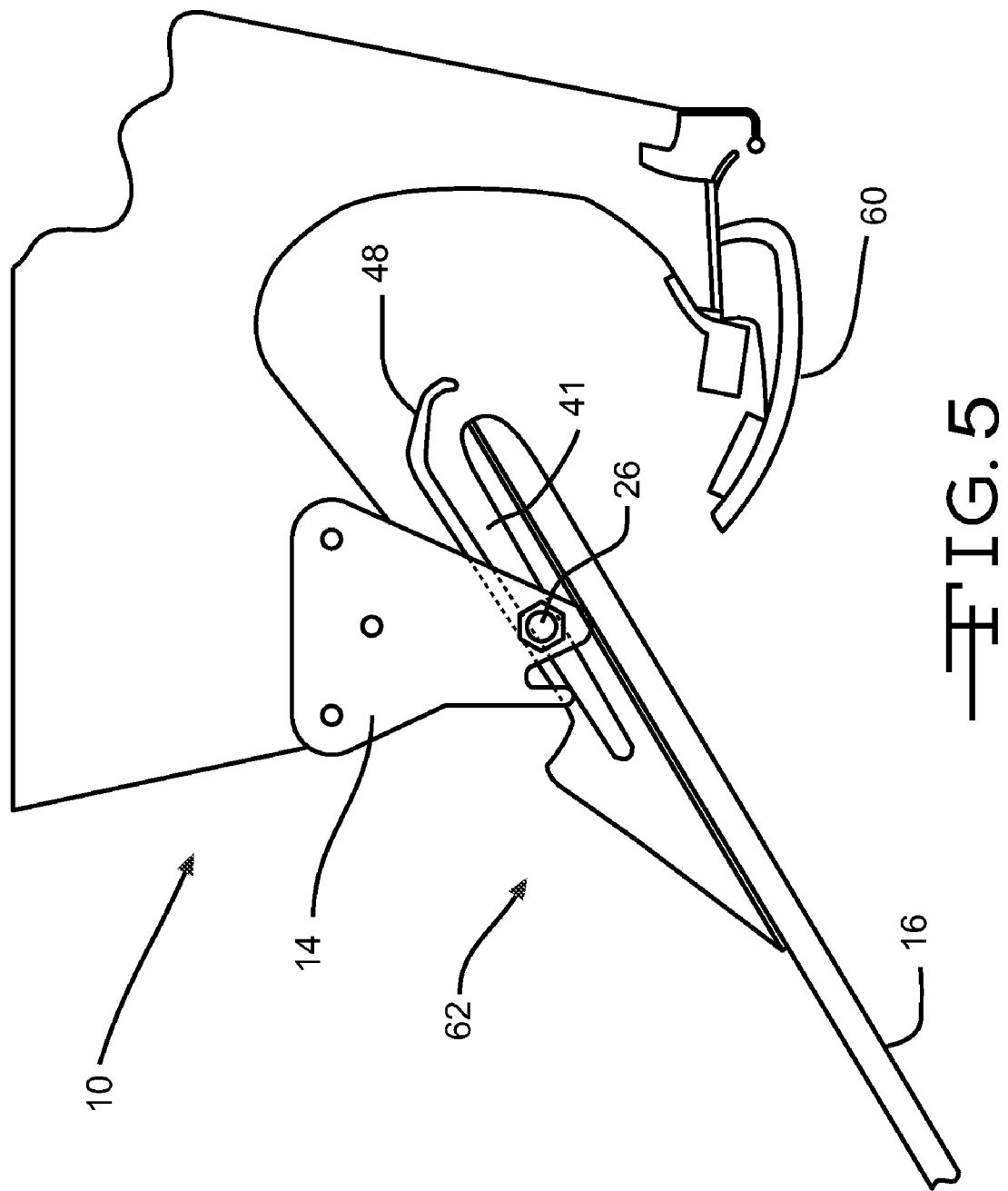
FIG. 5 shows a side view of the device of FIG. 1 in an intermediate position after the hinge has been partially slid and pivoted along a pin of the clevis.
Figure 6:
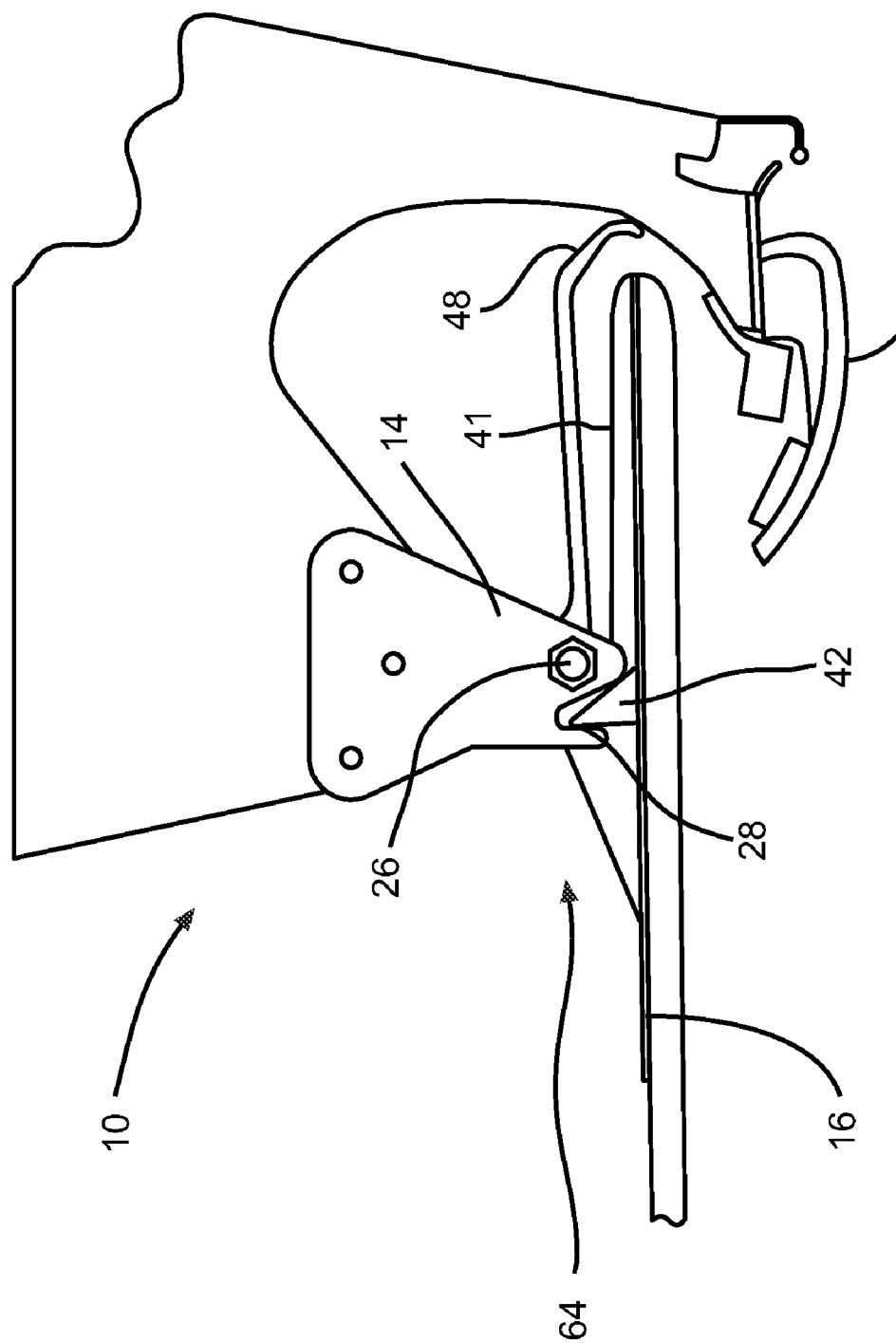
FIG. 6 shows a side view of the device of FIG. 1 in an advanced position after the hinge has been further slid and pivoted along a pin of the clevis.

FIG. 4 shows a side view of the device 10 of FIG. 1 prior to the hinge 16 being attached to the clevis 14. As shown, the angled end 48 of the elongated slot 41 may be positioned around the pin 26 of the clevis 14 to avoid the hinge 16 coming in contact with a light fixture 60, such as an aircraft stowage light. The elongated slot 41 of the hinge 16 may be slid along the pin 26 of the clevis 14, and pivoted/rotated into the intermediate position 62 shown in FIG. 5. The offset nature of the hinge 16 from the pin 26 may allow the hinge 16, and the attached ceiling panel 12, to be pivotally moved relative to the clevis 14 while avoiding contact with the light fixture 60. The elongated slot 41 of the hinge 16 may be further slid and pivoted along the pin 26 of the clevis 14 into the position 64 shown in FIG. 6. In this position, the second locking member 42 of the hinge 16 may begin to engage the first locking member 28 of the clevis 14. The elongated slot 41 of the hinge 16 may continue to be slid and pivoted along the pin 26 of the clevis 14 so that the first and second locking members 28 and 42 fully engage and lock the device 10 in the position 58 shown in FIG. 1. When the first and second locking members 28 and 42 are fully engaged, the attached ceiling panel 12 is fixedly hung. Subsequently, the hinge 16 may be rotated and pivoted in the opposite direction to disengage the hinge 16 from the clevis 14 to un-hang the ceiling panel 12.

Figure 7:
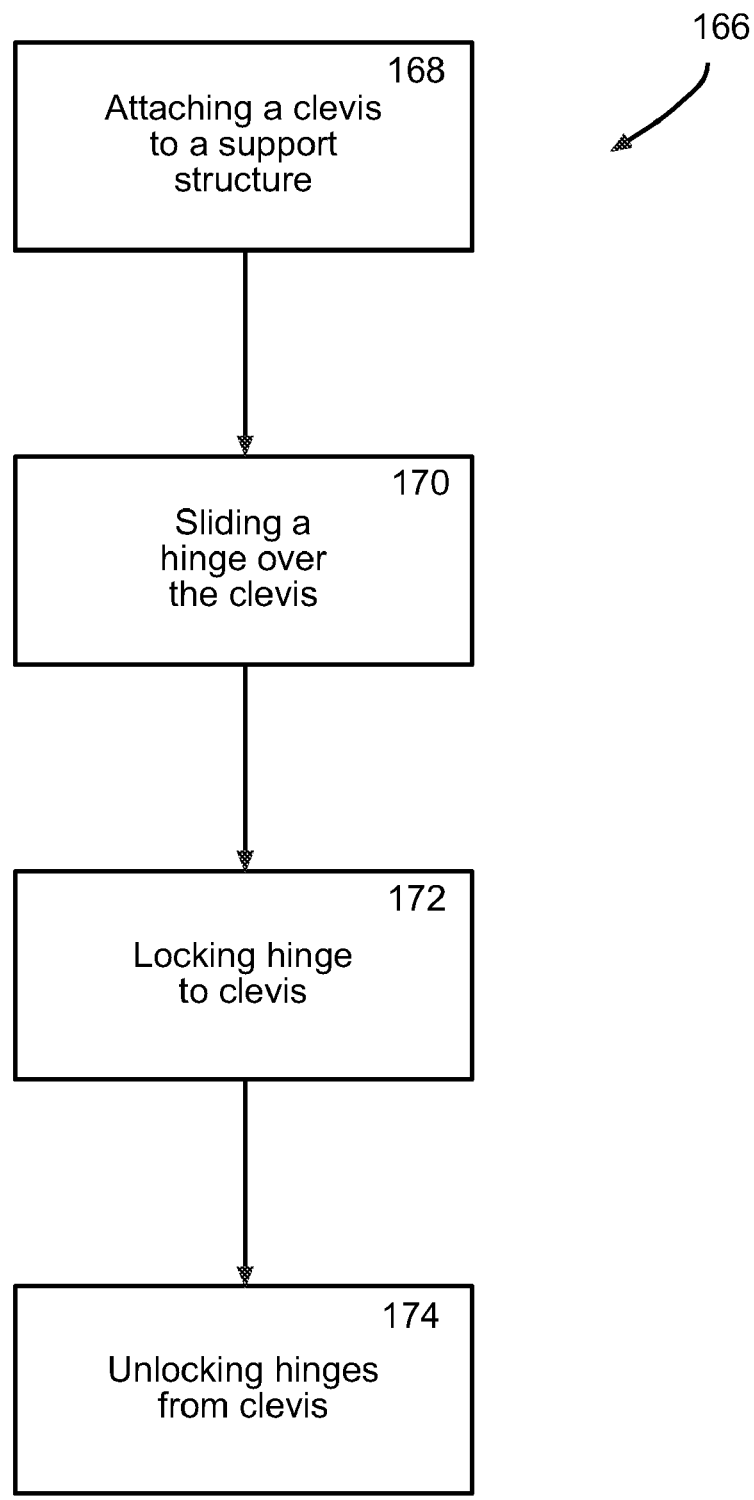
FIG. 7 is a flowchart showing one embodiment of a method of hanging a ceiling panel.

FIG. 7 is a flowchart showing one embodiment 166 of a method of hanging a ceiling panel 12. The ceiling panel 12 may comprise any of the embodiments disclosed herein. In one step 168, a clevis 14 may be attached to a support structure 18 using bolting or other attachment mechanism. The clevis 14 may comprise any of the embodiments disclosed herein. In another step 170, a hinge 16 may be attached to a ceiling panel 12 using bolting or other attachment mechanism. The hinge 16 may comprise any of the embodiments disclosed herein. In still anther step 170, an elongated slot 41 of the hinge 16 may be slid over a pin 26 of the clevis 14. At this time, the hinge 16 may be rotated relative to the clevis 14 thereby avoiding contact with a light fixture 60 or other structure. In yet another step 172, a first locking member 28 of the clevis 14 may be locked to a second locking member 42 of the hinge 16 in order to lock the hinge 16 and the attached ceiling panel 12 into a position 58. In this locked position 58, the hinge 16 may be disposed in a substantially perpendicular position with respect to the clevis 14. The first and second locking member 28 and 42 may comprise any of the embodiments disclosed herein. In an additional step 174, the first and second locking members 28 and 42 may be unlocked, and the hinge 16 may be removed from the clevis 14 to un-hang the ceiling panel 12.

One or more embodiments of the device 10 and/or methods disclosed herein may prevent damage to light fixtures 60, may provide for easier installation of a ceiling panel 12, may provide for easier un-installation of a ceiling panel 12, may avoid using multiple linking members thereby reducing cost, may increase load capabilities, may reduce the number of moving parts, may provide for easier engagement of the parts holding the ceiling panel 12 in place, and/or may reduce one or more other problems of one or more of the other existing devices and/or methods.

It should be understood, of course, that the foregoing relates to exemplary embodiments of the disclosure and that modifications may be made without departing from the spirit and scope of the disclosure as set forth in the following claims.

The invention claimed is:

1. A device for hanging a ceiling panel comprising:
   a clevis for attachment to a support structure, the clevis comprising a pin extending between opposed side-walls, and a first locking member comprising notches in the side-walls; and
   a hinge for attachment to a ceiling panel, the hinge comprising an elongated slot and a second locking member, wherein the second locking member comprises a plurality of bosses extending out of the hinge, the elongated slot forms a hook at one end of the hinge, the elongated slot is open at the hooked end and extends along the hinge to a closed end, and the open end of the elongated slot is adapted to slide relative to the pin until the bosses engage the notches to lock the hinge and a ceiling panel into a locked position.

2. The device of claim 1 wherein the device is for hanging a ceiling panel in an aircraft.

3. The device of claim 1 wherein the hinge is offset from the pin of the clevis allowing a ceiling panel to be pivotally hung to avoid contact with a light fixture.

4. The device of claim 1 wherein the hinge comprises only one member and no additional linkage members are connected to either of the clevis and the hinge.

5. The device of claim 1 wherein the support structure comprises a frame of an aircraft.

6. The device of claim 1 wherein the hinge has at least one opening for bolting the hinge to a ceiling panel.

7. The device of claim 1 wherein the elongated slot comprises two elongated, parallel surfaces.

8. The device of claim 1 wherein the bosses are disposed on opposing sides of the hinge, and the open end of the elongated slot is adapted to slide relative to the pin until the opposing bosses respectively engage the notches cut into the opposed side walls of the clevis to lock the hinge and the ceiling panel into the locked position.

9. The device of claim 1 wherein the hinge is adapted to be disengaged from the clevis to un-hang a ceiling panel.

10. The device of claim 1 wherein the hinge is adapted to pivot relative to the clevis when the elongated slot is slid over the pin of the clevis.

11. A method of hanging a ceiling panel comprising:
    attaching a clevis to a support structure;
    attaching a hinge having an elongated slot, that includes a closed end and an open end that forms a hook, to a ceiling panel;
    sliding the elongated slot of the hinge relative to a pin of the clevis; and
    locking notches of opposed side-walls of the clevis to opposed bosses of the hinge in order to secure the hinge and the attached ceiling panel into a locked position.

12. The method of claim 11 wherein the ceiling panel is an aircraft ceiling panel.

13. The method of claim 11 wherein the attaching the clevis to the support structure comprises bolting the clevis to the support structure.

14. The method of claim 11 wherein the attaching the hinge to the ceiling panel comprises bolting the hinge to the ceiling panel.

15. The method of claim 11 wherein during the sliding the elongated slot relative to the pin, the hinge rotates relative to the clevis.

16. The method of claim 15 wherein during the sliding the elongated slot relative to the pin, the hinge avoids contact with a light fixture.

17. The method of claim 11 wherein the locking comprises locking the opposed notches of the clevis to the respective opposed bosses of the hinge in order to secure the hinge and the attached ceiling panel into the locked position.

18. The method of claim 11 further comprising unlocking the notches of the clevis from the bosses of the hinge and removing the hinge from the clevis to un-hang the ceiling panel.

19. The method of claim 11 wherein the hinge comprises only one member and no additional linkage members are connected to either of the clevis and the hinge.

20. The method of claim 11 wherein the pin extends between the opposed side-walls of the clevis, and the bosses extend out of separate surfaces of the hinge.

21. A device holding a ceiling panel comprising:
- a clevis attached to a support structure, wherein the clevis comprises opposing notches in opposing side-walls of the clevis, and a pin extending between the opposing side-walls; and
- a hinge attached to the ceiling panel, wherein the hinge comprises bosses extending out of the hinge and an elongated slot comprising an open end that forms a hook and a closed end, wherein the bosses are engaged with the opposing notches locking the hinge and the ceiling panel in a locked position.

22. The device of claim 21 wherein the ceiling panel is an aircraft ceiling panel.

23. The device of claim 21 wherein the support structure is a frame of an aircraft.

24. The device of claim 21 wherein when the notches and the bosses are disengaged, and the pin is disposed within the elongated slot, the hinge pivots relative to the clevis.

25. The device of claim 21 wherein the hinge comprises only one member and no additional linkage members are connected to either of the clevis and the hinge.

26. The device of claim 21 wherein the bosses extend out of opposed surfaces of the hinge.

27. The device of claim 21 wherein the bosses are respectively engaged with the opposing notches of the opposing side-walls of the clevis locking the hinge and the ceiling panel in the locked position.

* * * * *